United States Patent
Trahan

[19]

[11] Patent Number: 5,934,009
[45] Date of Patent: Aug. 10, 1999

[54] FISH HOOK REMOVER

[76] Inventor: Olen P. Trahan, 278 Garnet St., Houma, La. 70364

[21] Appl. No.: 08/906,633

[22] Filed: Aug. 7, 1997

[51] Int. Cl.$^6$ ................................................. A01K 97/18
[52] U.S. Cl. .............................................. 43/53.5
[58] Field of Search ........................................... 43/53.5

[56] References Cited

U.S. PATENT DOCUMENTS

| | | | |
|---|---|---|---|
| 1,629,583 | 5/1927 | Nelson | 43/53.5 |
| 2,561,281 | 7/1951 | Lawrence | 43/53.5 |
| 3,670,448 | 6/1972 | Wehmeyer | 43/53.5 |
| 3,835,574 | 9/1974 | Harwood | 43/53.5 |
| 4,206,561 | 6/1980 | Wong et al. | 43/53.5 |
| 5,084,999 | 2/1992 | Henry | 43/53.5 |
| 5,138,791 | 8/1992 | Coes | 43/53.5 |

*Primary Examiner*—Robert P. Swiatek
*Attorney, Agent, or Firm*—Warner J. Delaune

[57] ABSTRACT

A fish hook remover for dislodging a hook from the mouth of a fish, comprising a handle constructed of a buoyant material having a specific gravity sufficient to cause the fish hook remover to float; an elongated hook removing member attached to the handle, wherein the hook removing member includes a V-shaped tip adapted to engage a hook; a hand guard attached to the handle, wherein the hand guard includes an outer periphery that is larger than the cross-sectional area of the handle; and a line looping member formed on the hand guard. Preferably, the hook removing member is constructed from stainless steel, and the handle is constructed from a plastic material. Also, it is preferred that the hand guard is formed as an integral part of the handle, and that the handle is of a color which is highly visible. In one embodiment, the line looping member comprises a post formed by a pair of slots cut into the hand guard, wherein the post includes downwardly converging sides to prevent the line from separating from the post during operation.

7 Claims, 4 Drawing Sheets

FISH HOOK REMOVER

BACKGROUND OF THE INVENTION

I. Field of the Invention

The present invention relates generally to devices employed in the sport of fishing, and more particularly to devices used to remove hooks from the mouths of fish.

II. Description of Prior Art

In the sport of fishing, one of the necessary activities is to remove the fishing hook from the mouth of the fish. This deceptively simple task is typically complicated, however, by a number of concerns. The hook normally includes a barb which prevents it from being easily pulled from the mouth. If the fish is to be released, as may be required by law in some instances, the embedded barb must be dislodged from the soft tissue of the fish without causing irreparable damage. This is especially difficult in situations where the fish has deeply swallowed the hook. Even if the fish will not be released, the hook must still be removed so that the fisherman can continue fishing.

To remove the hook, fisherman have often resorted to using common pliers, because the slippery surface of the fish does not allow one to leverage the hook from the mouth by using one's fingers alone. Most fish have pointed barbs of their own which protrude from their fins, as well as sharp teeth such as in speckled trout and flounder, which can inflict painful wounds while the hook is being removed. The use of pliers is not only cumbersome and ill-suited to the hook removal process, but it can also damage the hook. This can be extremely frustrating to the fisherman, especially when time is of the essence if there are many fish to be caught. Still another problem encountered in removing the hook is that the fishing line often gets in the way as the remover is maneuvered into position. The fishing line may also become damaged by the stretching and twisting of the hook remover, especially if the line is rubbed across the very fine, sharp teeth of some fish.

Many devices have been developed which attempt to solve the problems associated with fish hook removal. For example, U.S. Pat. Nos. 5,084,999; 4,206,561; 3,835,574; and 3,670,448 all disclose hook removers which employ an elongated rigid member having a substantially V-shaped tip for capturing the embedded hook. Of the aforementioned devices, only U.S. Pat. No. 3,670,448, issued to Wehmeyer, tries to keep the fishing line aligned with the hook remover, and this is for the purpose of locating the hook when it cannot be seen. In that patent, a separate removable cross bar must be inserted into the handle so that the fishing line can be secured to the hook remover. Unfortunately, the two-piece construction of the Wehmeyer device has the disadvantage that the cross bar may be easily misplaced in a fill tackle box, or lost entirely.

While the above devices provide some benefits, they lack at least two key features. First, none of the known hook removers includes a means of guarding the fisherman's hand from the teeth of the fish. Second, they do not provide a simple and effective way, using a one-piece unitary construction, of keeping the fishing line close to the hook remover.

SUMMARY OF THE INVENTION

It is therefore an object of this invention to provide a fish hook remover which can effectively remove the hook with a minimum of damage to the fish.

It is also an object of this invention to provide a fish hook remover which protects the hand of the fisherman from the teeth of the fish.

It is a further object of this invention to provide a fish hook remover which permits alignment and temporary attachment of the fishing line to the fish hook remover during the hook removal process to prevent damage to the line.

Yet another object of this invention is to provide a fish hook remover which is safe and simple to use, and which is buoyant in the event that it falls into the water.

These and other objects and advantages of the present invention will no doubt become apparent to those skilled in the art after having read the following description of the preferred embodiment which are contained in and illustrated by the various drawing figures.

Therefore, in a preferred embodiment, a fish hook remover for dislodging a hook from the mouth of a fish is provided, comprising a handle constructed of a buoyant material having a specific gravity sufficient to cause the fish hook remover to float; an elongated hook removing member attached to the handle, wherein the hook removing member includes a V-shaped tip adapted to engage a hook; a hand guard attached to the handle, wherein the hand guard includes an outer periphery that is larger than the cross-sectional area of the handle; and a line looping member formed on the hand guard. Preferably, the hook removing member is constructed from stainless steel, and the handle is constructed from a plastic material. Also, it is preferred that the hand guard is formed as an integral part of the handle, and that the handle is of a color which is highly visible. In one embodiment, the line looping member comprises a post formed by a pair of slots cut into the hand guard, wherein the post includes downwardly converging sides to prevent the line from separating from the post during operation.

DETAILED DESCRIPTION OF THE PREFERRED EMBODIMENTS

Figure 1:
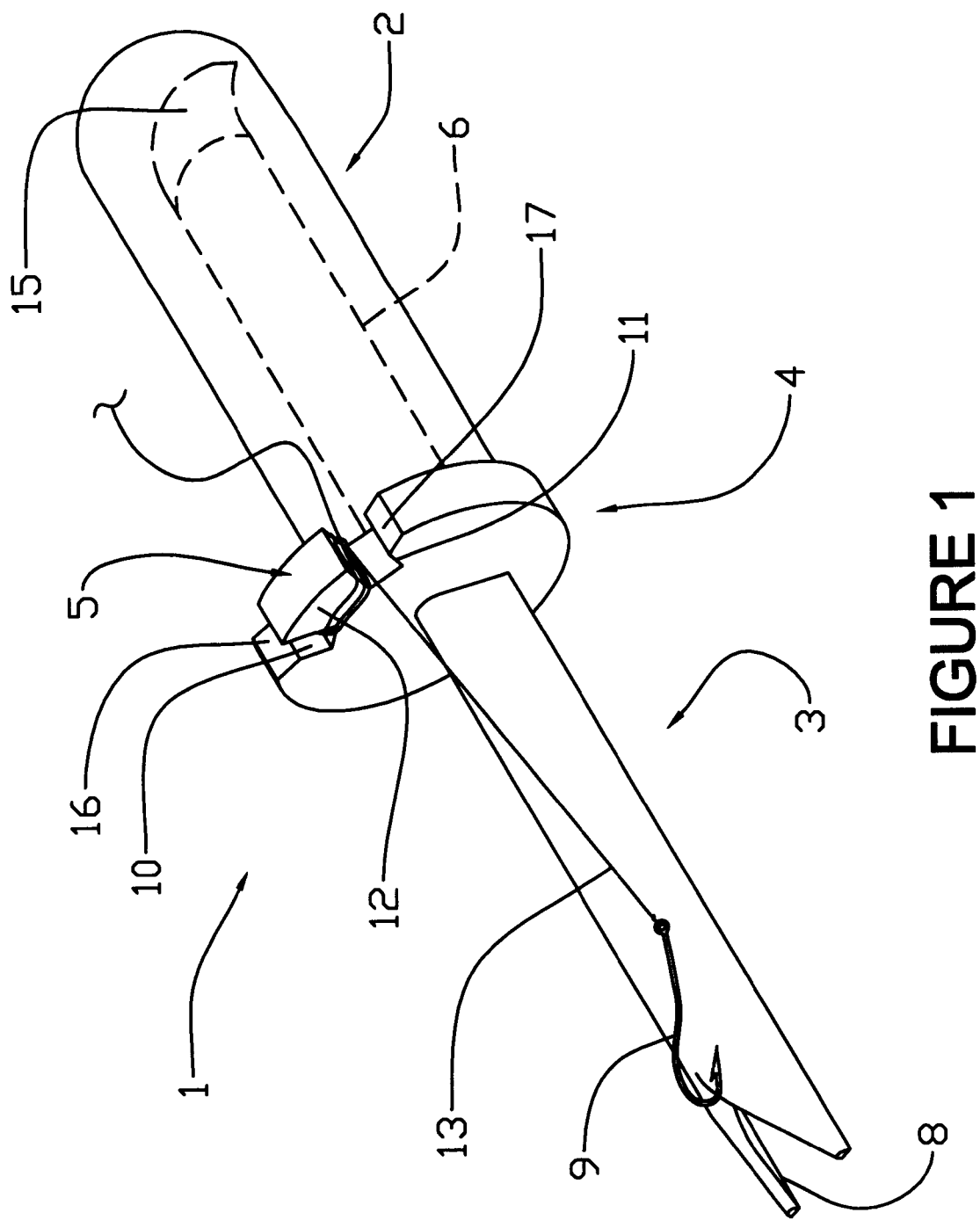
FIG. 1 is a perspective view of a preferred embodiment of the fish hook remover depicting the manner in which the fishing line and hook are engaged.

Turning now to FIG. 1, a preferred embodiment 1 of the fish hook remover of the present invention is shown to generally include a handle 2, a hook removing member 3, a hand guard 4, and a line looping member 5. These basic elements are operatively connected to one another, as will be further described in greater detail below, to produce a fish hook remover which satisfies each of the aforementioned objectives of the present invention.

Figure 2:
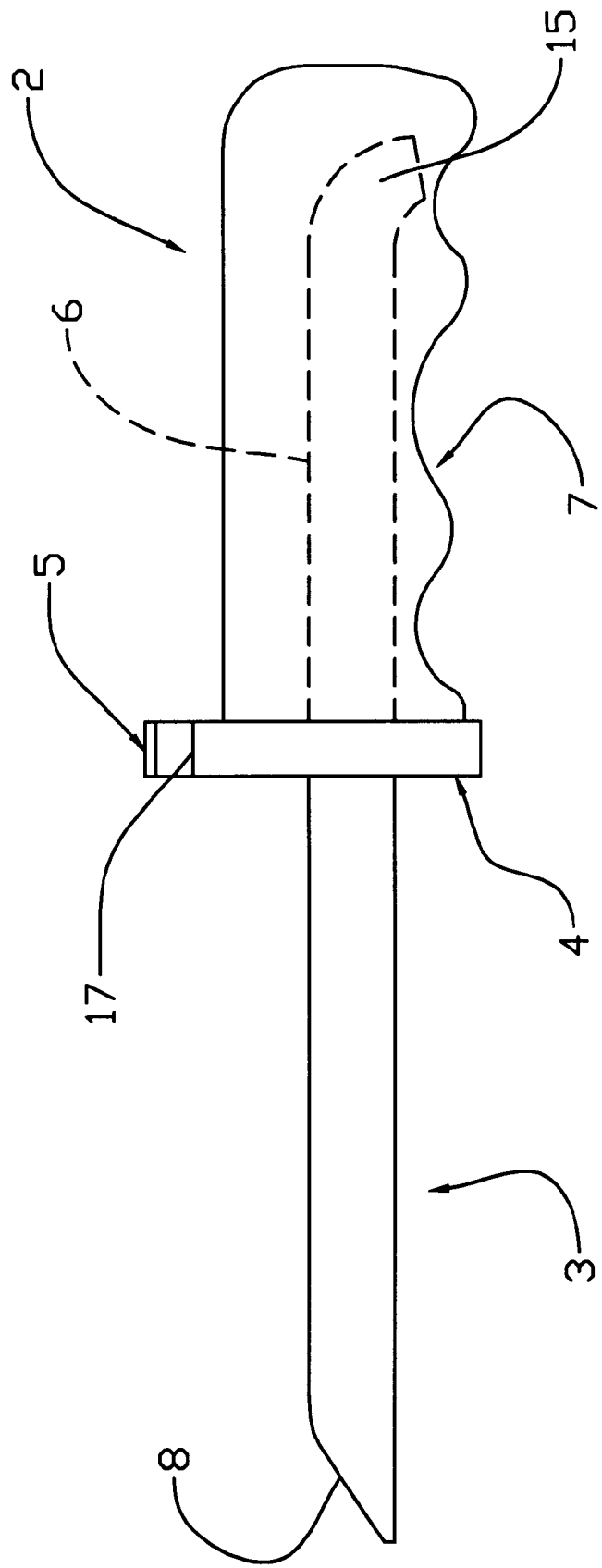
FIG. 2 is a side view of the fish hook remover of FIG. 1.
Figure 3:
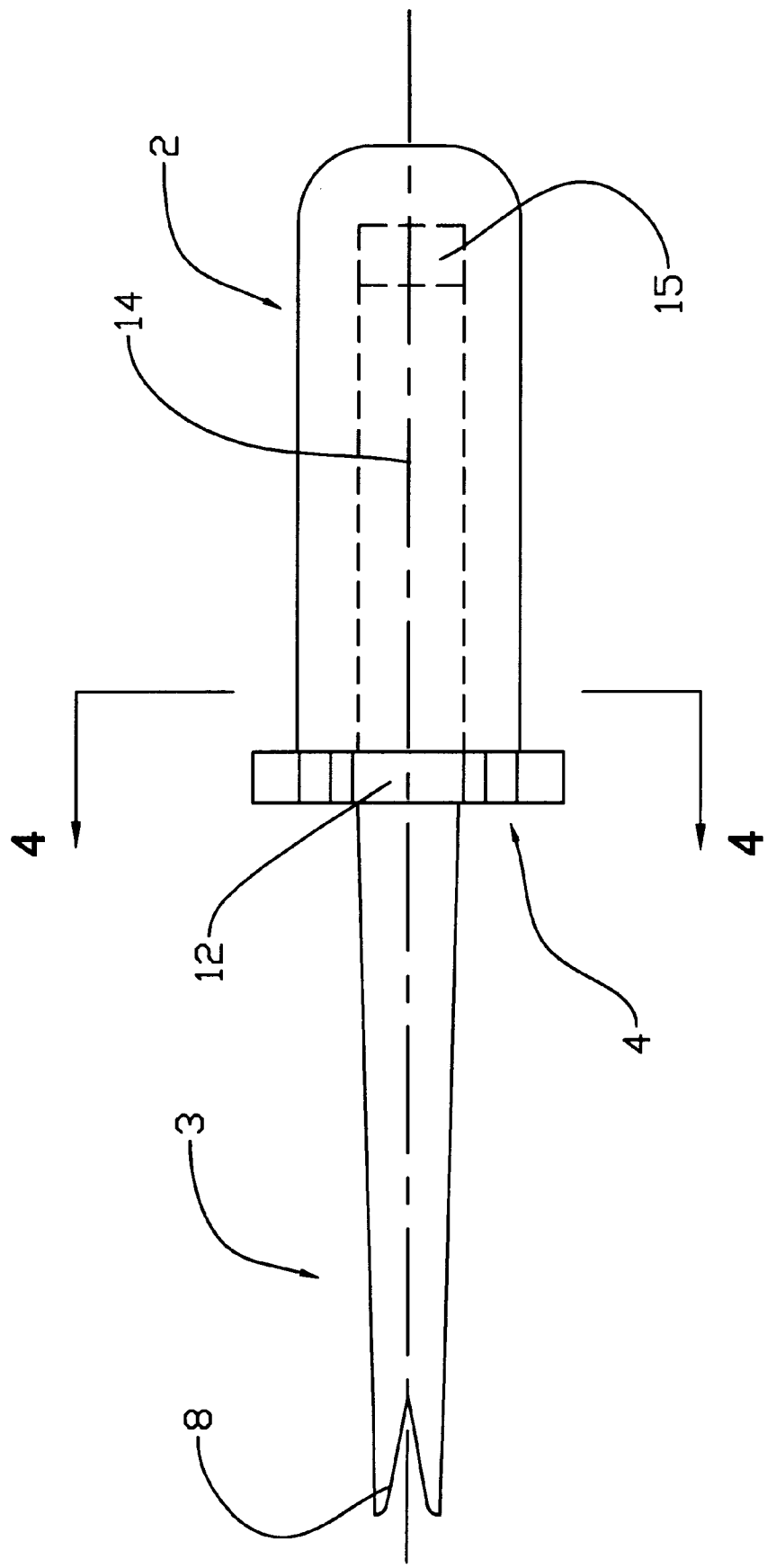
FIG. 3 is a top view of the fish hook remover of FIG. 1.

The handle 2 is preferably constructed from a tough synthetic material, such as ABS plastic or other material having similar operational and chemical-resistant characteristics, having a specific gravity less than that of water for buoyancy purposes. Specifically, the buoyancy of the handle 2 should be at least sufficient to allow the entire weight of the fish hook remover 1 to float visibly on the surface of the water. Alternatively, the handle 2 may be constructed of wood, assuming that it meets the previous buoyancy requirements. In any case, the primary functions of the handle 2 are to: (1) firmly retain the base 6 of the hook removing member 3, (2) withstand the stresses imparted to it through conventional use, and (3) maintain the entire fish hook remover 1 buoyant if dropped into the water. Any material which performs this function would be acceptable for use with the invention. Although not expressly required, it is highly advantageous for the handle 2 to have an easily visible color, such as bright orange or yellow or red, so that it can be readily seen and retrieved if misplaced. Such color can either be a characteristic of the formed handle material itself or it can be applied to the handle 2 at a later time. As best shown in FIG. 2, a plurality of grooves or finger grips 7 are preferably formed into the underside of the handle 2 so as to reduce slippage and increase leverage under wet conditions.

The hook removing member 3 comprises a base 6, which is permanently attached within the handle 2, as well as a V-shaped tip 8. The hook removing member 3 is preferably formed from a length of sheet metal which has been formed into a V-shape, or equivalent cross section, in order to increase its stiffness during use. In consideration of the forces that are applied to the hook removing member 3 during operation, the strength of attachment of the base 6 to the handle 2 is exceptionally critical. Therefore, it is preferred that the handle 2 be molded or formed around the base 6 to increase the contact strength between those components. Also, the terminal end 15 of base 6 should be bent downward so that hook removing member 3 resists being pulled from handle 2. The hook removing member 3 is preferably constructed from a substantially rigid, corrosion-resistant material, such as stainless steel or any other similar material, and is preferably tapered from the handle 2 to the V-shaped tip 8 to reduce weight without sacrificing structural rigidity. The length of the elongated hook removing member 3 should be sufficient to allow the V-shaped tip 8 to firmly engage the hook 9 (as depicted in FIG. 1) prior to the mouth of the fish coming into contact with the hand guard 4. The thickness of the hook removing member 3 should be sufficient to prevent undesirable bending of the device as the hook 9 is disengaged, and the V-shaped tip 8 preferably includes rounded corners so as to allow easy insertion of the device into the mouth of the fish without causing further unnecessary damage.

Figure 4:
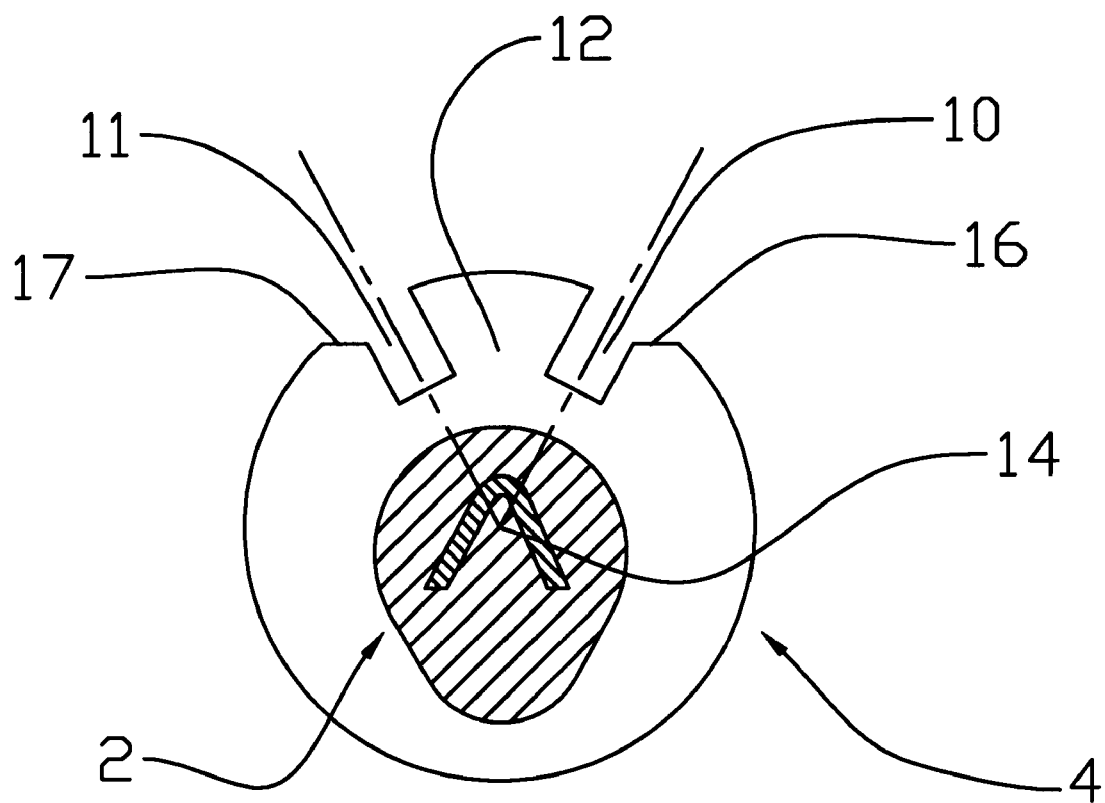
FIG. 4 is a sectional view of the fish hook remover depicting the hand guard and the integrated line looping feature.

As indicated previously, the hand guard 4 protects the hand of the fisherman from contacting the mouth of the fish which may contain sharp teeth. The precise shape of the hand guard 4 is not particularly important, except that its outer periphery should be larger than the cross-section of the handle 2 and provide protection against contact from the entire area around the hook removing member 3. For example, as shown in FIGS. 1 and 4, one embodiment of the hand guard 4 depicts an outer periphery that is circular in shape. Advantageously, the hand guard 4 may be attached to either or both of the handle 2 and/or the hook removing member 3. By way of illustration only, it may preferably be formed as an integral part of the handle 2.

The line looping member 5 is included as a part of the hand guard 4 by the formation of a pair of slots 10,11 in planes substantially perpendicular to the plane of the hand guard 4. Slots 10,11 are formed so as to allow winding of the fishing line 13 around the post 12 between the slots 10,11. Preferably, the plane of each slot 10,11 cut into the hand guard 4 passes through the central longitudinal axis 14 of the fish hook remover 1, thus creating downwardly converging sides on the post 12, as shown in the sectional view of FIG. 4. In this configuration, the winding of line 13 around the post 12 will prevent the loops from separating from the post 12. It is also preferred that the slots 10,11 include chamfers 16,17 which will facilitate the looping of the fishing line 13 around the post 12. Therefore, unlike prior art devices, the present invention beneficially allows alignment and winding of the fishing line 13 with the fish hook remover 1 without the need for a two-part construction.

In operation of the invention, the fish is gripped by one hand while the fish hook remover 1 is gripped by the other hand. The V-shaped tip 8 is guided into the mouth of the fish until it engages the curved portion of the hook 9. Once the hook 9 is engaged, the fishing line 13 is pulled straight and wrapped several times around the post 12 on the hand guard 4. The remainder of the line 13 behind the hand guard 4 can be gripped with the handle 2 to keep it tight around the post 12. The handle 2 is then pushed deeper to dislodge the hook 9 from the mouth of the fish and then twisted about a quarter turn to clear the hook away from the fish's mouth. Once the hook 9 is fully removed, the line 13 is unwound from the post 12, and fishing can be resumed.

Although the present invention has been described in terms of specific embodiments, it is anticipated that alterations and modifications thereof will no doubt become apparent to those skilled in the art. For example, it will be appreciated that the present invention may be constructed in a wide variety of sizes. In the case of smaller versions for use with small fish, the hook removing member 3 may alternatively be constructed from plastic, and the entire device may be manufactured from a single material in a single, unitary process. It is therefore intended that the following claims be interpreted as covering all such alterations and modifications as fall within the true spirit and scope of the invention.

I claim:

1. A fish hook remover for dislodging a hook from the mouth of a fish, comprising:

(a) a handle constructed of a buoyant material having a specific gravity sufficient to cause said fish hook remover to float;

(b) an elongated hook removing member attached to said handle, wherein said hook removing member includes a V-shaped tip adapted to engage a hook;

(c) a hand guard attached to said handle, wherein said hand guard includes an outer periphery that is larger than the cross-sectional area of said handle; and (d) a line looping member formed on said hand guard, wherein said line looping member comprises a post formed by a pair of slots cut into said hand guard, said pair of slots being chamfered to facilitate looping of a fishing line therearound.

2. The fish hook remover of claim 1, wherein said hook removing member is constructed from stainless steel.

3. The fish hook remover of claim 1, wherein said handle is constructed from a plastic material.

4. The fish hook remover of claim 1, wherein said hook removing member includes a V-shaped cross-section.

5. The fish hook remover of claim 1, wherein said hand guard is formed as an integral part of said handle.

6. The fish hook remover of claim 1, wherein said handle is of a color which is highly visible.

7. The fish hook remover of claim 1, wherein said post includes downwardly converging sides.

* * * * *